May 12, 1964  G. WENGATZ  3,132,599
UNDERFRAMES FOR RAILWAY VEHICLES
Filed March 27, 1958
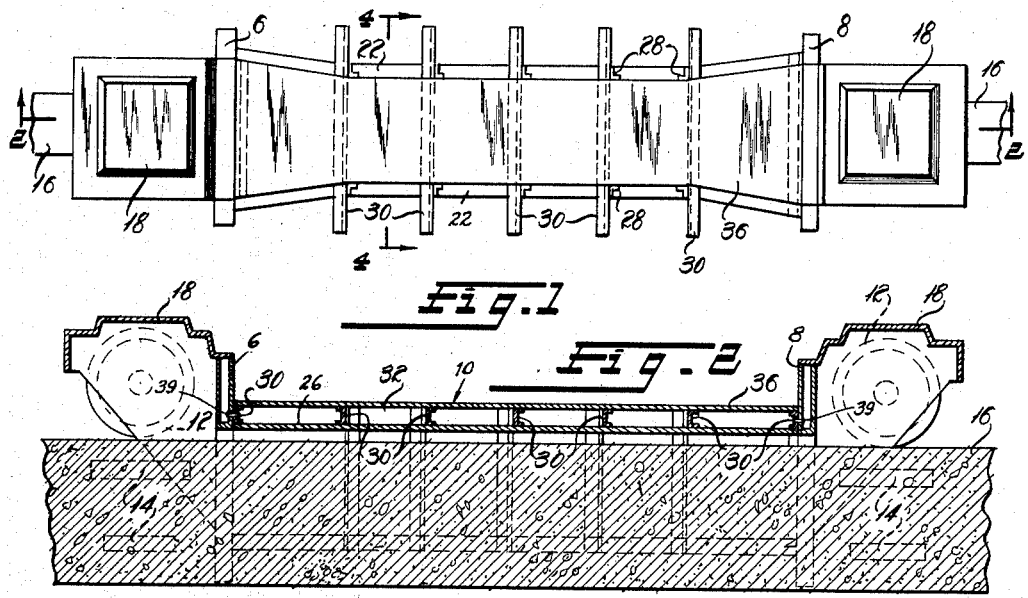
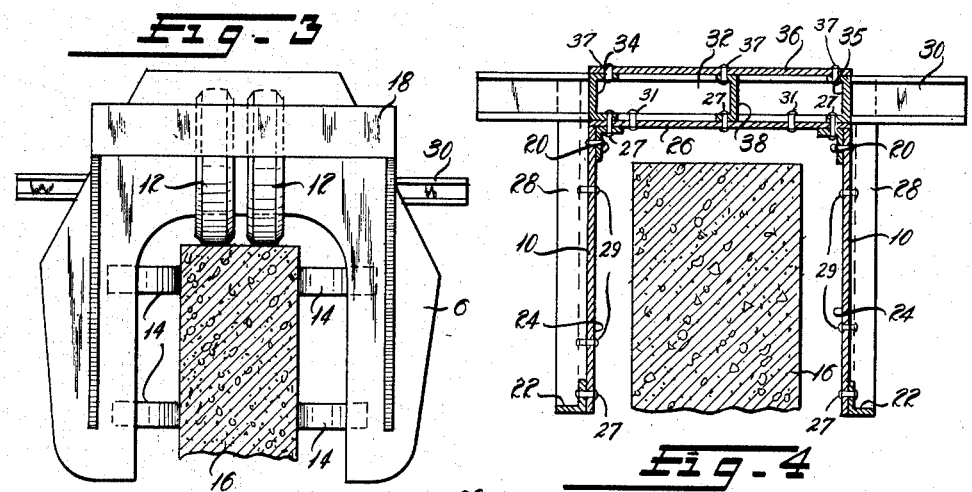
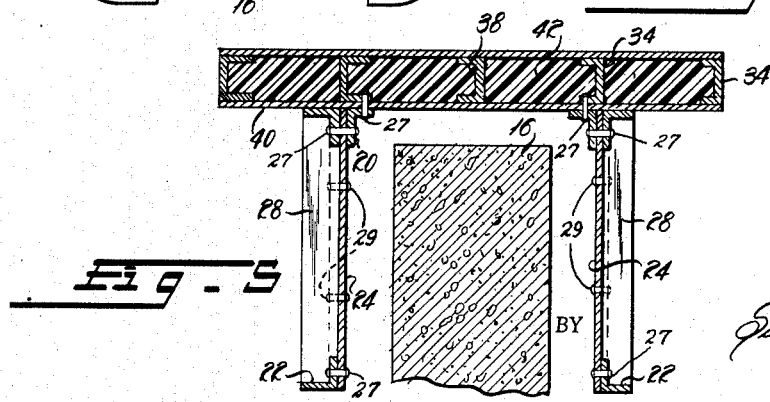
INVENTOR
GÜNTER WENGATZ
BY
ATTORNEYS United States Patent Office 3,132,599
Patented May 12, 1964

3,132,599
UNDERFRAMES FOR RAILWAY VEHICLES
Günter Wengatz, Cologne-Sulz, Germany, assignor to Alweg-Forschung G.m.b.H.-Cologne, Cologne, Germany, a corporation of Germany
Filed Mar. 27, 1958, Ser. No. 724,350
4 Claims. (Cl. 105—145)

This invention relates to vehicle underframes and more particularly to improved underframes for vehicles of the so-called monobeam type railways which straddle the beam-shaped supporting structure.

Vehicles of this type are provided with load-supporting wheels running on the top surface of the supporting beam and with side wheels adapted to ride along the side beam surfaces.

Due to changes of the loads on the wheels as, e.g., caused by irregularities or discontinuities of the running surfaces or by varying disposition of the load within the vehicle those vehicles are twisted around their longitudinal axis. These twisting motions cause unpleasant noises by rubbing of structural parts of the vehicle body on each other and may lead to jamming of the doors or windows and even to destruction of the vehicle body. Also overload of the springs and tires or reduction of the riding comfort and braking perforamnce may be caused. It is especially disadvantageous that a breakdown of a guiding element, such as the blowout of a pneumatic tire or breaking of a spring, may lead to a destruction of the part or even of the supporting structure if the vehicle has a torsional elasticity around its longitudinal axis.

In the past the torsional rigidity of a vehicle has been increased by the use of the well known stressed-skin construction of the vehicle body. This, however, can only be done satisfactorily if openings of substantial size in the shell are avoided. But openings for doors and windows should be as large as possible for convenience and visibility. Under those conditions a true monocoque construction cannot be obtained and the vehicle body contributes very little towards an increase of the torsional rigidity of the vehicle.

It is the principal purpose and object of the present invention to provide an improved underframe comprising a central longitudinally extending assembly which has a high torsional resistance while maintaining low weight and structural simplicity.

In attaining this primary object and other objects the invention contemplates the provision of a novel underframe construction in which closed sheet metal cells are fixedly secured between transverse girders to the central assembly.

Preferably the sheet metal cells extend only slightly above the transverse girders. By means of this measure torsionally elastic central underframes for vehicles, especially vehicles adapted to ride a monobeam supporting structure, can be kept free of substantial torsional deformations.

An especially advantageous result is obtained for those U-shaped central underframes in which, in order to save space, the webs are bent at certain spaced points along their length. In this case the provision of torsionally resistant elements, such as said closed sheet metal cells, directly on the longitudinally extending underframe permits the sheet metal cell elements to absorb torsional moments which are produced at the angled points of the webs of the longitudinal U-shaped underframe, and which statically cannot be taken up by those angled parts of said webs.

Advantageously the tops of those sheet metal cells are constituted directly by the floor sheet of the vehicle. Also the lower walls of the cells preferably form wholly or partly the base of a U-shaped structure extending longitudinally of the vehicle.

Additional objects and advantages will become apparent as the description proceeds in connection with the accompanying drawings in which:

FIGURE 1 is a top plan view of the underframe for a vehicle adapted to ride on a monobeam supporting structure;

FIGURE 2 is a central longitudinal section taken along line 2—2 of FIGURE 1;

FIGURE 3 is a front view showing the mounting plate for the running gear of the vehicle;

FIGURE 4 is a cross-section taken along line 4—4 of FIGURE 1;

FIGURE 5 is a cross-sectional diagrammatic view similar to FIGURE 4, however of another embodiment.

Now referring more particularly to the figures and especially to FIGURES 1 to 4, the underframe includes two framelike members 6 and 8 each forming a mounting plate for a running gear and fixedly connected to each other by means of a U-shaped underframe construction generally designated by numeral 10. The running gear per se does not form part of this invention. It may take a number of forms and is preferably of the type shown in co-pending application Serial No. 603,389. Load carrying and guide wheels 12 and 14 respectively are indicated in dashed lines in FIGURES 2 and 3 and are adapted to ride the top and side running surfaces of a supporting beam generally indicated by numeral 16. A cell-like covering for each running gear is indicated generally at 18.

The U-shaped underframe construction 10 has at both ends a width corresponding to the width of the framelike members 6 and 8 for the running gears. From there on this width becomes smaller in order to save space and to permit the space at each side of this underframe to be utilized for equipment, such as motors, electric accessories and the like.

The underframe comprises longitudinally extending upper and lower L-shaped angle irons 20 and 22 respectively connected to each other by lateral and top sheets 24 and 26 respectively, the angle irons being secured to the sheets by any suitable means such as rivets 27. Vertical struts 28 serve for stiffening the lateral sheets 24. The sheets 24 and vertical struts 28 constitute vertically extending webs. The struts 28 may be secured to the lateral sheets 24 by any suitable means such as rivets 29. U-shaped transverse girders 30 are secured by rivets 31 to the sheet 26. In order to increase the torsional rigidity according to the invention between those transverse girders 30 and symmetrically to the longitudinal axis of the underframe closed cells 32 are provided by means of longitudinally arranged sections 34 and 35 fixedly secured to the sheet 26 by means of rivets 27 or the like. The tops of the cells are covered by sheets 36 also fixedly secured to the sections 34 and 35 and to the transverse girders 30, e.g., by rivets 37. Sections 38 are arranged centrally between the sections 34 and 35 to further stiffen the cells. The intermediate frame assembly comprising sheets 24, 26 and 36 and the associated girders and angle irons is secured at its opposite ends to the framelike members 6 and 8 by any suitable means such as rivets 39.

FIGURE 5 shows by way of example another embodiment of the invention, in which the torsionally resistant cells extend along the entire length of the transverse girders 30. In this case the sheet 40, which constitutes the base of the U-shaped underframe as well as the lower wall of the cells, is wider than the sheet 26 of the embodiment described heretofore.

In either form of the invention the cells are filled by a plastic foam 42, e.g., vinyl chloride polymers. By means of this plastic a high resistance to buckling and increased resistance to deformation under torsional loading of the sheet metal cells can be obtained. Further this plastic effectively soundproofs the sheet walls.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An elongated underframe of inverted U-shape for railway vehicles of the monobeam type adapted to run along a massive track beam comprising a pair of spaced vertically extending webs running the length of said underframe and forming the sides of said U, said webs being spaced apart along their entire length to form a space for reception of said beam therebetween, each web comprising a metal sheet reinforced along its top and bottom edges by angle irons, transverse wheel supporting frames rigidly secured to each end of each of said webs and projecting above said webs to form wheel housings, and a metal cell structure extending horizontally between said webs and said end frames and being secured to said webs and said end frames, said cell structure comprising transverse girders and sheet metal members secured to the upper and lower edges of said girders to form with said girders closed metal cells to increase the resistance of the underframe to twisting movements about the longitudinal axis of the underframe, at least a portion of the bottom of said metal cells forming the base of said U-shaped underframe.

2. The structure according to claim 1 in which said metal cells are of substantially the same length as said transverse girders.

3. The structure according to claim 1 wherein said webs are spaced apart a predetermined distance at said transverse frames and are bent inwardly intermediate their ends so that they are spaced apart a distance substantially less than said predetermined distance centrally of said underframe.

4. The structure according to claim 1 wherein said cells extend across at least a third of the width of said underframe and are arranged symmetrically about the longitudinal axis of said underframe.

References Cited in the file of this patent

UNITED STATES PATENTS

| 813,427 | Howard | Feb. 27, 1906 |
| 2,485,047 | Grieg | Oct. 18, 1949 |
| 2,591,654 | Dean | Apr. 1, 1952 |
| 2,620,751 | Watter | Dec. 9, 1952 |
| 2,739,677 | Greulich | Mar. 27, 1956 |
| 2,756,689 | Hinsken et al. | July 31, 1956 |
| 2,853,960 | Corrigan | Sept. 30, 1958 |

FOREIGN PATENTS

| 543,215 | Italy | May 18, 1956 |
| 964,605 | Germany | May 23, 1957 |